United States Patent [19]

Buxbaum et al.

[11] Patent Number: 4,499,219

[45] Date of Patent: Feb. 12, 1985

[54] STABILIZED THERMOPLASTIC POLYESTER MOULDING COMPOSITION

[75] Inventors: Lothar Buxbaum, Villach/Sankt Georgen, Austria; Franz Breitenfellner, Bensheim; Thomas Kainmüller, Lindenfels, both of Fed. Rep. of Germany

[73] Assignee: Ciba-Geigy Corporation, Ardsley, N.Y.

[21] Appl. No.: 554,011

[22] Filed: Nov. 21, 1983

Related U.S. Application Data

[63] Continuation-in-part of Ser. No. 412,742, Aug. 30, 1982, abandoned.

[30] Foreign Application Priority Data

Sep. 9, 1981 [CH] Switzerland ..................... 5822/81

[51] Int. Cl.³ .......................... C08K 5/15; C08K 534
[52] U.S. Cl. ...................................... 524/94; 524/97; 524/98; 524/99; 524/102; 524/104; 524/105; 524/114; 524/242

[58] Field of Search ............... 524/94, 97, 98, 114, 524/242, 99, 102, 104, 105

[56] References Cited

U.S. PATENT DOCUMENTS

| | | | |
|---|---|---|---|
| 3,959,215 | 5/1976 | Schneider | 524/97 |
| 4,010,219 | 3/1977 | Aoyama et al. | 524/114 |
| 4,080,360 | 3/1978 | Schlichting et al. | 524/98 |

FOREIGN PATENT DOCUMENTS

| | | | |
|---|---|---|---|
| 56-38346 | 4/1981 | Japan . | |
| 6120757 | 9/1981 | Japan | 524/97 |
| 0119041 | 9/1975 | Japan | 524/94 |
| 1525331 | 9/1978 | United Kingdom . | |
| 1564214 | 4/1980 | United Kingdom . | |

*Primary Examiner*—Morton Foelak
*Assistant Examiner*—Kriellion Morgan
*Attorney, Agent, or Firm*—Luther A. R. Hall

[57] ABSTRACT

Moulding compositions based on thermoplastic polyesters can be effectively protected against thermal degradation, if they contain, as a first stabilizer, a polyepoxide compound and, as a second stabilizer, a bisoxazoline or a dicarboxylic acid imide or amide.

15 Claims, No Drawings

STABILIZED THERMOPLASTIC POLYESTER MOULDING COMPOSITION

This application is a continuation-in-part application of application Ser. No., 412,742, filed Aug. 30, 1982, now abandoned.

The present invention relates to a moulding composition which is based on thermoplastic polyesters and which is stabilised against thermal degradation by a polyepoxide compound and a second stabiliser.

Thermoplastic polyesters are valuable moulding compositions for the manufacture of utility articles of any kind. Due to the relatively high melting points, polyesters must be processed at high temperatures, and this leads to a considerable reduction in the viscosity and hence in the molecular weight of the polyesters. However, good mechanical properties, in particular good toughness properties, require a high viscosity in the moulding. The problem cannot be solved by employing polyesters having very high viscosities. On the one hand, this is uneconomical in manufacture and, on the other hand, processing is adversely affected by a high melt viscosity.

Various stabilisers against thermal degradation have therefore been proposed in the past, inter alia also polycarbodiimides (German Auslegeschrift No. 1,285,747) and polyepoxide compounds (German Auslegeschrift No. 2,556,317). Although they prevent an excessive degradation, these stabilisers do not yet meet the requirements made in practice.

It is the object of the present invention even more effectively to suppress the molecular weight degradation of thermoplastic polyesters during processing.

The present invention provides a moulding composition, based on a thermoplastic polyester and containing effective amounts of (a) as a first stabiliser, a polyepoxide compound, having on average more than one epoxide group per molecule, and (b) at least one second stabiliser selected from the group comprising the bisoxazolines of the formula I

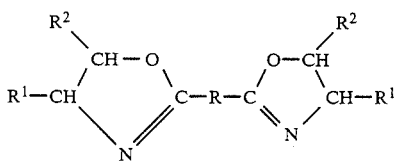

and the dicarboxylic acid imides and amides of the formula II

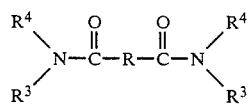

in which R is alkylene, cycloalkylene, unsubstituted arylene or arylene substituted by halogen, $R^1$ and $R^2$ independently of one another are a hydrogen atom, aryl, cycloalkyl or alkyl, $R^3$ is alkyl, cycloalkyl, or aryl or aralkyl which are unsubstituted or substituted by alkyl or halogen, and $R^4$ is acyl or $R^3$ and $R^4$ together are a radical of the formula —$C_nH_{2n}CO$—, in which n is a number from 3 to 11, or $R^3$ and $R^4$ together are a radical of the formula

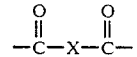

in which X is ethylene or ethenylene which are unsubstituted or substituted by alkyl, or is a carbocyclic radical which is unsubstituted or substituted by alkyl or halogen and to which both the carbonyl groups are bonded in orthopositions.

Linear thermoplastic polyesters suitable for the moulding compositions according to the invention are preferably crystalline or partially crystalline and, in the latter case especially, have melting points of at least 150° C. However, they can also be in an amorphous form, in which case the polyester then preferably has a second-order transition point of at least 70° C., in particular at least 100° C. The intrinsic viscosity of the polyesters is preferably at least 0.6 dl/g, especially at least 0.8 dl/g.

The polyesters can be homopolyesters or copolyesters, which are built up from aliphatic, cycloaliphatic, aromatic or heterocyclic dicarboxylic acids or esters thereof, and diols or hydroxycarboxylic acids. Mixtures of these polyesters are also suitable. Their composition essentially depends on the desired properties for a particular application.

The aliphatic dicarboxylic acids can contain 2 to 40 C atoms, the cycloaliphatic dicarboxylic acids can contain 6 to 10 C atoms, the aromatic dicarboxylic acids can contain 8 to 14 C atoms, the aliphatic hydroxycarboxylic acids can contain 2 to 12 C atoms and the aromatic and cycloaliphatic hydroxycarboxylic acids can contain 7 to 14 C atoms.

The aliphatic diols can contain 2 to 12 C atoms, the cycloaliphatic diols can contain 5 to 8 C atoms and the aromatic diols can contain 6 to 16 C atoms.

The diols and dicarboxylic acids designated as aromatic are those in which two hydroxyl groups or carboxyl groups are bonded to one and the same or different aromatic hydrocarbon radicals.

It is also possible that the polyesters are branched, as a result of containing small quantities, for example 0.1 to 3 mol %, relative to the dicarboxylic acids present, of more than bifunctional monomers (for example pentaerythritol or trimellitic acid).

In polyesters prepared from at least 3 monomers, the resultant structural elements can be randomly distributed, or the polyesters can be block polymers.

Suitable dicarboxylic acids are linear and branched saturated aliphatic dicarboxylic acids, aromatic dicarboxylic acids and cycloaliphatic dicarboxylic acids.

Aliphatic dicarboxylic acids which can be used are those having 2 to 40 C atoms, for example oxalic acid, malonic acid, dimethylmalonic acid, succinic acid, octadecylsuccinic acid, pimelic acid, adipic acid, trimethyladipic acid, sebacic acid, azelaic acid and dimer acids (dimerisation products of unsaturated aliphatic carboxylic acids, such as oleic acid).

Cycloaliphatic dicarboxylic acids which can be used are: 1,3-cyclobutanedicarboxylic acid, 1,3-cyclopentanedicarboxylic acid, 1,3- and 1,4-cyclohexanedicarboxylic acid, 1,3- and 1,4-di-(carboxylmethyl)-cyclohexane and 4,4'-dicyclohexyldicarboxylic acid.

Suitable aromatic dicarboxylic acids are: especially terephthalic acid, isophthalic acid, phthalic acid as well as 1,3-, 1,4-, 2,6- or 2,7-naphthalenedicarboxylic acid, 4,4'-diphenyldicarboxylic acid, 4,4'-diphenylsulfonecarboxylic acid, 1,1,3-trimethyl-5-carboxyl-3-(p-carboxyl-phenyl)-indane, 4,4'-diphenyl ether-dicarboxylic acid and bis-p-(carboxylphenyl)-methane.

Aromatic dicarboxylic acids, and amongst these in particular terephthalic acid, isophthalic acid and phthalic acid, are preferred.

Further suitable dicarboxylic acids are those which contain —CO—NH— groups; they are described in German Offenlegungsschrift No. 2,414,349. Dicarboxylic acids containing N-heterocyclic rings are also suitable, for example those derived from carboxylalkylated, carboxylphenylated or carboxybenzylated monoamino-s-triazinedicarboxylic acids (cf. German Offenlegungsschriften Nos. 2,121,184 and 2,533,675), mono- or bis-hydantoins, benzimidazolones, which may be halogenated, or parabanic acid. The carboxylalkyl group can here contain 3 to 20 C atoms.

Suitable aliphatic diols are the linear and branched aliphatic glycols, in particular those having 2 to 12, in particular 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol and 1,12-diodecanediol. An example of a suitable cycloaliphatic diol is 1,4-dihydroxycyclohexane. Further suitable diols are, for example, 1,4-dihydroxymethylcyclohexane, aromatic-aliphatic diols, such as p-xylylene glycol or 2,5-dichloro-p-xylylene glycol, 2,2-(β-hydroxyethoxyphenyl)-propane and a polyoxaalkylene glycol, such as diethylene glycol, triethylene glycol or polyethylene glycol. Preferably, the alkylene diols are linear and contain especially 2 to 4 carbon atoms.

Alkylenediols, 1,4-dihydroxycyclohexane and 1,4-dihydroxymethylcyclohexane are preferred as the diols. Ethylene glycol and 1,4-butanediol are particularly preferred.

Further suitable diols are the β-hydroxyalkylated bisphenols, in particular β-hydroxyethylated bisphenols, such as 2,2-bis-[4'-(β-hydroxyethoxy)-phenyl]-propane. Further bisphenols are mentioned below.

A further group of suitable diols are the heterocyclic diols described in German Offenlegungsschriften Nos. 1,812,003, 2,342,432, 2,342,372 and 2,453,326.

Examples are:
N,N'-Bis-(β-hydroxyethyl)-5,5-dimethylhydantoin,
N,N'-bis-(β-hydroxypropyl)-5,5-dimethylhydantoin,
methylene-bis-[N-(β-hydroxyethyl)-5-methyl-5-ethylhydantoin], methylene-bis-[N-(β-hydroxyethyl)-5,5-dimethylhydantoin], N,N'-bis-(β-hydroxyethyl)-benzimidazolone, N,N'-bis-(β-hydroxyethyl)-tetrachlorobenzimidazolone or N,N'-bis-(β-hydroxyethyl)-tetrabromobenzimidazolone.

The aromatic diols can be mononuclear diphenols and especially binuclear biphenols which carry one hydroxyl group on each aromatic nucleus. Aromatic radicals are preferably to be understood as meaning hydrocarbon-aromatic radicals, for example phenylene or naphthylene. In addition to, for example, hydroquinone, those bis-phenols should be singled out which can be represented by the following formula:

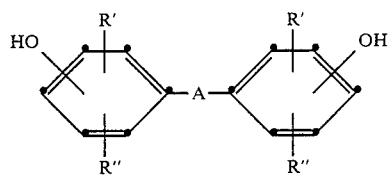

The hydroxyl groups can be located in the m-position, but especially the p-position, and R' and R" in this formula can be alkyl having 1 to 6 C atoms, halogen, such as chlorine or bromine, and in particular hydrogen atoms. A can be a direct bond, or it can be O, S, SO₂, or substituted or unsubstituted alkylidene, cycloalkylidene or alkylene.

Examples of unsubstituted or substituted alkylidene are: ethylidene, 1,1- or 2,2-propylidene, 2,2-butylidene, 1,1-isobutylidene, pentylidene, hexylidene, heptylidene, octylidene, dichloroethylidene and trichloroethylidene.

Examples of substituted or unsubstituted alkylene are methylene, ethylene, phenylmethylene, diphenylmethylene and methylphenylmethylene. Examples of cycloalkylidene are cyclopentylidene, cyclohexylidene, cycloheptylidene and cyclooctylidene.

Examples of bisphenols are:
Bis-(p-hydroxyphenyl) ether or bis-(p-hydroxyphenyl) thioether, bis-(p-hydroxyphenyl)-sulfone, bis-(p-hydroxyphenyl)-methane, 1,2-bis-(p-hydroxyphenyl)-ethane, 1-phenyl-bis-(p-hydroxyphenyl)-methane, and diphenyl-bis-(p-hydroxyphenyl)-methane, 2,2-bis-(4'-hydroxy-3'-dimethylphenyl)-propane, 1,1- or 2,2-bis-(p-hydroxyphenyl)-butane, 1,1-dichloro- or 1,1,1-trichloro-2,2-bis-(p-hydroxyphenyl)-ethane, 1,1-bis-(p-hydroxyphenyl)-cyclopentane and especially 2,2-bis-(p-hydroxyphenyl)-propane (bisphenol A) and 1,1-bis-(p-hydroxyphenyl)-cyclohexane (bisphenol C).

Examples of suitable polyesters of hydroxycarboxylic acids are polycaprolactone, polypivalolactone or the polyesters of 4-hydroxycyclohexanecarboxylic acid or 4-hydroxybenzoic acid.

Polyesters with aromatic dicarboxylic acids have gained the greatest importance, in particular the polyalkylene terephthalates. Therefore, moulding compositions according to the invention, in which the polyester is built up from at least 30 mol %, preferably at least 40 mol %, of aromatic dicarboxylic acids and to the extent of at least 30 mol %, preferably at least 40 mol %, from alkylene diols having preferably 2 to 12 C atoms, relative to the polyester, are preferred.

Particularly in this case, the alkylene diol is linear and contains 2 to 6 C atoms, for example ethylene glycol, trimethylene glycol, tetramethylene glycol or hexamethylene glycol, and the aromatic dicarboxylic acid is terephthalic and/or isophthalic acid. Particularly preferred polyesters are polyalkylene terephthalates, especially polyethylene terephthalate and poly-1,4-butylene terephthalate as well as copolyesters based on polyalkylene terephthalates, more particularly polyethylene terephthalate and poly-1,4-butylene terephthalate.

The polyepoxide compounds used for the moulding compositions according to the invention are especially those containing on average more than one glycidyl group, β-methylglycidyl group or 2,3-epoxycyclopentyl group bonded to a hetero-atom (for example sulfur, preferably oxygen or nitrogen), in particular bis-(2,3-epoxycyclopentyl) ether, diglycidyl or polyglycidyl ethers of polyhydric aliphatic alcohols, such as 1,4-butanediol, or polyalkylene glycols, such as polypropylene glycols, diglycidyl or polyglycidyl ethers of cycloaliphatic polyols, such as 2,2-bis-(4-hydroxycyclohexyl)-propane, diglycidyl or polyglycidyl ethers of polyhydric phenols, such as resorcinol, bis-(p-hydroxyphenyl)-methane, 2,2-bis-(p-hydroxyphenyl)-propane (bisphenol A), 2,2-bis-(4'-hydroxy-3',5'-dibromophenyl)-propane and 1,1,2,2,-tetrakis-(p-hydroxyphenyl)-ethane, or diglycidyl or polyglycidyl ethers of condensation products of phenols with formaldehyde, otained under acid conditions, such as phenol novolaks and cresol novolaks, di-(β-methylglycidyl) or poly-(β-methylglycidyl) ethers of the polyhydric alcohols or polyhydric phenols listed above, polyglycidyl esters of polybasic carboxylic acids, such as phthalic acid, terephthalic acid, Δ$^4$-tetrahydrophthalic acid and hexahydrophthalic acid, N-glycidyl derivatives of amines, amides and heterocyclic nitrogen bases, such as N,N-diglycidylaniline, N,N-diglycidyltoluidine and N,N,N',N'-tetraglycidyl-bis-(p-aminophenyl)-methane, triglycidyl isocyanurate, N,N'-diglycidylethyleneurea, N,N'-diglycidyl-5,5-dimethylhydantoin, N,N'-diglycidyl-5-isopropylhydantoin and N,N'-diglycidyl-5,5-dimethyl-6-isopropyl-5,6-dihydrouracil.

The diglycidyl or polyglycidyl ethers of polyhydric phenols, in particular those of the aromatic diols defined above, especially bisphenols, and of phenol or cresol novolaks are preferred.

The first and the second stabiliser can each be present in a quantity of 0.01 to 10% by weight, preferably 0.01 to 5 and especially 0.1 to 3% by weight, relative to the polyester.

Linear or branched alkylene radicals R in the formulae I and II contain preferably 2 to 12, in particular 2 to 6, C atoms, cycloalkylene radicals R contain preferably 5 to 7, especially 6, ring C atoms and arylene radicals R contain 6 to 12 C atoms. Cycloalkylene is especially cyclohexylene, and arylene is especially phenylene or naphthylene. The halogen substituent is preferably chlorine or bromine. Arylene radicals R are, however, preferably unsubstituted. m- and p-Cyclohexylene and m- and p-phenylene are also preferred.

Aryl radicals $R^1$ and $R^2$ are especially phenyl, cycloalkyl radicals $R^1$ and $R^2$ are cyclohexyl and alkyl radicals $R^1$ and $R^2$ contain especially 1 to 6 C atoms. Especially, $R^1$ and $R^2$ are hydrogen atoms. Those compounds of the formula I are particularly preferred in which $R^1$ and $R^2$ are hydrogen atoms and R represents —CH$_2$)$_r$— with r being 2 to 10, 1,3- or 1,4-phenylene, 1,3- or 1,4-cyclohexylene, more particularly 1,3-phenylene or especially 1,4-phenylene.

Alkyl radicals $R^3$ contain especially 1 to 12, in particular 1 to 6 and especially 1 to 4 C atoms, cycloalkyl radicals $R^3$ contain 5 to 7 ring C atoms, unsubstituted aryl radicals $R^3$ contain 6 to 12 C atoms and unsubstituted aralkyl radicals $R^3$ contain 7 to 12 C atoms. Alkyl substituents in $R^3$ contain preferably 1 to 6 C atoms and halogen substituents in $R^3$ are especially chlorine or bromine. Cycloalkyl is especially cyclohexyl, aryl is especially phenyl or naphthyl and aralkyl is especially benzyl.

Acyl radicals $R^4$ contain preferably 2 to 18, in particular 2 to 12, C atoms. Especially, it is of the formula $R^7$CO—, in which $R^7$ is linear or branched C$_{1-4}$-alkyl or C$_{2-4}$-alkenyl, cycloalkyl having especially 5 to 7 ring C atoms, aryl, especially phenyl and naphthyl, and aralkyl, especially benzyl or α- or β-phenylethyl. Acetyl and benzoyl are preferred acyl radicals $R^4$.

X is preferably ethylene or ethenylene which are unsubstituted or monosubstituted or disubstituted, especially in 1,2-position, by alkyl groups having 1 to 6 C atoms. Carbocyclic radicals X can be cycloalkylene or cycloalkenylene having 4 to 12, preferably 5 to 8, ring carbon atoms, or they can be aromatic hydrocarbon radicals having 6 to 12 ring carbon atoms. Amongst the carbocyclic radicals, X is preferably cyclopentylene, cyclohexylene, cyclohexenylene, phenylene or naphthylene which are unsubstituted or substituted by alkyl having 1 to 6 C atoms, or by chlorine or bromine.

The radical —C$_n$H$_{2n}$— can be branched, but is preferably linear. Preferably, n is a number from 3 to 8. In particular, the —C$_n$H$_{2n}$— radical is 1,4-butylene or 1,5-pentylene.

A preferred group of compounds of the formula II is that in which $R^3$ is alkyl having 1 to 4 carbon atoms, cyclohexyl, phenyl or naphthyl, and $R^4$ is acetyl or benzoyl, or $R^3$ and $R^4$ together are a radical of the formula —C$_n$H$_{2n}$CO— in which n is a number from 3 to 8, or $R^3$ and $R^4$ together are a radical of the formula

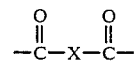

in which X is unsubstituted ethylene or ethenylene or 1,2-phenylene optionally substituted by 1 to 4 chlorine or bromine atoms.

A preferred sub-group of compounds of the formula II, in which $R^3$ and $R^4$ together are

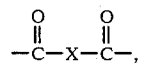

are those of the formula

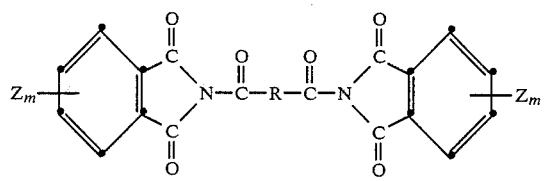

in which R is in particular alkylene having 2 to 12 C atoms, cycloalkylene having 5 to 7 ring C atoms and especially arylene, for example m- or p-phenylene, Z is chlorine or bromine and m is 0 or a number from 1 to 4.

Examples of alkyl are: methyl, ethyl, propyl, i-propyl, butyl, i-butyl, t-butyl, 1-pentyl, 2-pentyl, 3-pentyl, hexyl, 2-hexyl, 3-hexyl, heptyl, octyl, 2-ethylhexyl, nonyl, decyl, undecyl, dodecyl, hexadecyl and octadecyl.

Examples of cycloalkyl are: cyclopentyl, methylcyclopentyl, cyclohexyl, methylcyclohexyl, ethylcyclohexyl, cycloheptyl and cyclooctyl.

Examples of aryl and aralkyl are: phenyl, naphthyl, chlorophenyl, dichlorophenyl, bromophenyl, methylphenyl, dimethylphenyl, ethylphenyl, butylphenyl, hexylphenyl, nonylphenyl, benzyl, α- and β-phenylethyl, 3-phenylpropyl, methylbenzyl, ethylbenzyl, methylphenylethyl and chlorobenzyl.

Examples of alkylene are: methylene, ethylene, 1,2- or 1,3-propylene, 1,2-, 1,3- or 1,4-butylene, pentylene, hexylene, octylene, 2-ethylhexylene, decylene and dodecylene. Examples of cycloalkylene are cyclopentylene, methylcyclopentylene, cyclohexylene, methylcyclohexylene, cycloheptylene and cyclooctylene.

Examples of arylene are o-, m- and p-phenylene, 1,2- or 1,6-naphthylene, chlorophenylene and dichlorophenylene.

Examples of X are: ethylene, methylethylene, 1,2-dimethylethylene, propylethylene, hexylethylene, octylethylene, decylethylene, dodecylethylene, ethenylene, methylethenylene, 1,2-dimethylethenylene, butylethenylene, cyclohex-1-en-1,2-ylene, cyclohexylene, methylcyclohexylene, o-phenylene, o-naphthylene, mono-, di-, tri- or tetra-chloro-o-phenylene or mono-, di-, tri- or tetrabromo-o-phenylene.

The compounds of the formulae I and II are known or can be prepared by methods known per se.

Preferably, the dicarboxylic acid imide or amide of formula II is one in which R represents —($CH_2$)$_r$— with r being 2 to 10, 1,3- or 1,4-cyclohexylene and especially 1,3- or 1,4-phenylene, $R^3$ is alkyl having 1 to 4 carbon atoms or phenyl and $R^4$ is acetyl or benzoyl, or $R^3$ and $R^4$ together are a radical of the formula —$C_nH_{2n}CO$— in which n is a number from 3 to 8, especially 3 to 5 or $R^3$ and $R^4$ together are a radical of the formula

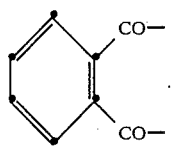

Most preferably, as the second stabilizer, a bisoxazoline of the formula

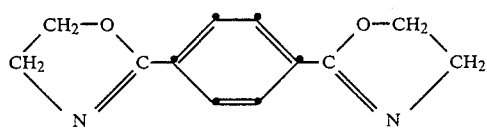

or an imide of the formulae

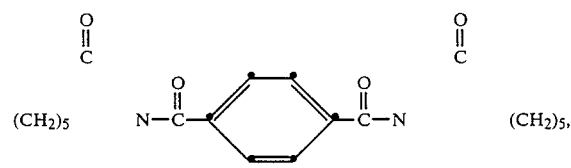

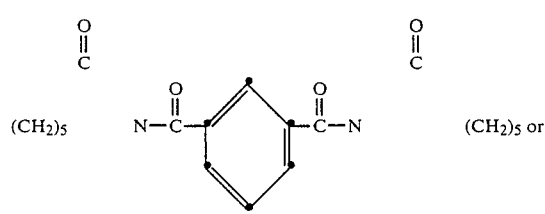

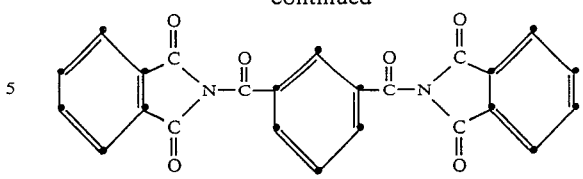

are employed.

The moulding composition according to the invention can additionally contain a reinforcing (fibrous) filler, for example asbestos fibres, carbon fibres or especially glass fibres. The total quantity of reinforcing filler is 5 to 60, preferably 10 to 40%, by weight, relative to the total composition. The fillers can be coated with an adhesion-promoter, in order to improve their bonding to the polyester.

The moulding composition according to the invention can also additionally contain 3 to 25% by weight, preferably 8 to 20% by weight, relative to the polyester, of a flame-retarding additive.

Examples of suitable flame-retarding additives are organic halogen compounds, in particular chlorine compounds or bromine compounds, which are used alone or together with synergistically acting compounds containing elements of the fifth main group of the periodic system, in particular phosphorus and antimony compounds, in particular antimony trioxide.

Flame-proofing agents based on organic compounds containing chlorine and/or especially bromine are known. These can be compounds which are incorporated into the plastic as a mixing component, or they can be compounds which are built as reactive monomers into the polymer molecules. Examples of the latter are tetrachlorophthalic anhydride, dichloroterephthalic acid or lower alkyl esters thereof, tetrabromophthalic anhydride, tetrabromobisphenol A, N,N'-bis-(β-hydroxyethyl)-tetrachlorobenzimidazolone or N,N'-bis-(β-hydroxyethyl)-tetrabromobenzimidazolone.

Further examples of chlorine-containing and/or bromine-containing compounds are:

Polytribromostyrene, polypentabromostyrene, decabromodiphenyl, tetrabromodiphenyl, hexabromodiphenyl ether, octabromodiphenyl ether, decabromodiphenyl ether, tetrabromodiphenyl sulfide, hexabromodiphenylsulfone, 3-(2',4',6'-tribromophenoxy)-1,2-propanediol, dibromophthalic acid or tetrabromophthalic acid or their anhydrides, dibromoterephthalic acid, hydroxy-ethylated di- or tetrabromobisphenol A, tetrabromo-1,4-di-(hydroxymethyl)-benzene, tetrabromobenzimidazolone, N,N'-alkylene-bis-tetrabromophthalimide and the analogous chlorine compounds. Further organic halogen compounds are described, for example, in German Offenlegungsschrift No. 2,242,450.

The thermoplastic polyesters are known and commercially available, or they can be prepared by polycondensation processes known to the state of the art.

The preparation of the moulding compositions according to the invention is likewise carried out in accordance with methods customary in the state of the art, by incorporating the additives into the thermoplastic polyester during or after the polycondensation, by addition to the reaction mass or to the molten polyester, or by regranulation.

Further customary additives can also be added, for example, further fillers, such as talc, mica, metal powders, silica aerosol, kaolin, calcium carbonate, dolomite, silicates or glass beads, inorganic or organic pigments, fluorescent brighteners, delustering agents, slip agents, mould-release aids, crystallisation promoters, antioxidants and light stabilisers. It is particularly advantageous to add, as a co-stabiliser, an additional 0.1 to 5, preferably 0.1 to 3, % by weight, relative to the polyester, of a phosphate. The latter preferably is of the formula $$(R^8O)_3P,$$
$$\overset{O}{\overset{\|}{}}$$

in which $R^8$ is $C_6$-$C_{18}$-alkyl, $C_6$-$C_{16}$-cycloalkyl, $C_6$-$C_{12}$-aryl, $C_7$-$C_{18}$-alkaryl or -aralkyl or $C_8$-$C_{18}$-alkaralkyl. Aryl is especially phenyl. Triphenyl phosphate is preferred.

The moulding compositions can be processed into utility articles of any kind by conventional shaping processes, such as casting, compression-moulding, injection-moulding and extrusion. Examples of such articles are components of engineering equipment, equipment housings, domestic appliances, sports equipment, electrical insulators, automotive components, circuits, sheets, films and semi-finished articles which can be shaped by machining.

The moulding compositions according to the invention have a surprisingly high stability in processing. Only a slight fall in viscosity is still observed, or none at all. The effect is considerably improved as compared with the first stabiliser alone. Even at relatively high processing temperatures, excellent processing stability is observed. The stabilising effect manifests itself with particular advantage even during incorporation by regranulation.

The described preferred features of the moulding compositions according to the invention can of course be combined in any desired manner, as long as the combination still gives a technically feasible product.

The example which follows explains the invention in more detail. The intrinsic viscosity is determined at 30° C. on a solution of 1 g of polyester in a 1:1 mixture of 1,1,2,2-tetrachloroethane and phenol.

EXAMPLE

Polybutylene terephthalate having an intrinsic viscosity of 1.18 dl/g is thoroughly mixed with the quantity of additives, given in Table 1, and is remelted by means of a Göttfert laboratory bench extruder (20 mm screw) at 250° C. barrel temperature to give stabilised granules. The intrinsic viscosity of these granules is determined.

These granules are then used for injection-moulding standard small bars on an Aarburg injection-moulding machine, a sample is taken after every 30 shots, and the intrinsic viscosity is determined.

This processing was carried out once at barrel temperatures of 250° C. and once at barrel temperatures of 270° C. The results are shown in the table below. In the table:

A = bisphenol A epoxide resin having 0.38 epoxide equivalent/kg

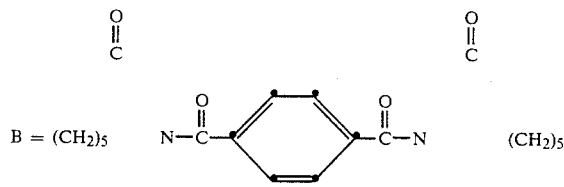

B = (CH$_2$)$_5$ ...

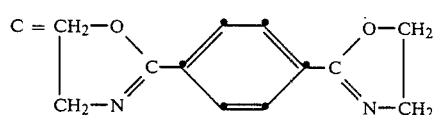

C = ...

D = triphenyl phosphate

E (CH$_2$)$_5$ ...

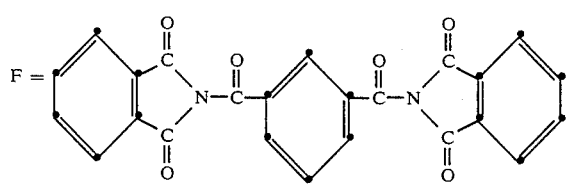

F = ...

G = epoxy cresol novolak resin having 4.35 epoxide equivalents/kg.

TABLE

| Additive (% by weight) | [dl/g] of the granules | [dl/g] after processing at 250° C. | [dl/g] after processing at 270° C. |
|---|---|---|---|
| 1% of A + 0.5% of B | 1.17 | 1.09 | 0.96 |
| 1% of A + 1% of B | 1.17 | 1.23 | 1.00 |
| 1% of A + 2% of B | 1.18 | 1.31 | 1.03 |
| 1% of A + 0.5% of B + 0.5% of C | 1.19 | 1.41 | 1.15 |
| 1% of A + 0.5% of B + 0.5% of D | 1.16 | 1.03 | 1.06 |
| 1% of A + 0.5% of C + 1.0% of D | 1.20 | 1.19 | 1.14 |
| 1% of A + 1% of E | 1.15 | 1.10 | 0.89 |
| 1% of A + 1% of F | 1.13 | 1.18 | 0.87 |
| 1% of G + 0.5% of B | 1.19 | 1.14 | 0.88 |
| 1% of G + 1% of B | 1.20 | 1.24 | 0.89 |

What is claimed is:

1. A moulding composition, based on a thermoplastic polyester, which comprises effective amounts of (a) as a first stabiliser, a polyepoxide compound, having on average more than one epoxide group per molecule, and (b) at least one second stabiliser selected from the group consisting of the bisoxazolines of the formula I

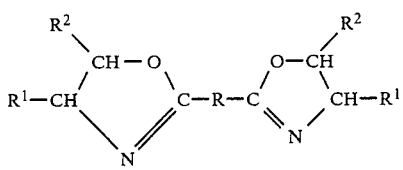 (I)

and the dicarboxylic acid imides and amides of the formula II

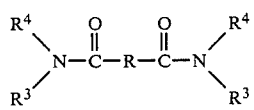 (II)

in which R is alkylene, cycloalkylene, unsubstituted arylene or arylene substituted by halogen, $R^1$ and $R^2$ independently of one another are a hydrogen atom, aryl, cycloalkyl or alkyl, $R^3$ is alkyl, cycloalkyl, or aryl or aralkyl which are unsubstituted or substituted by alkyl or halogen, and $R^4$ is acyl, or $R^3$ and $R^4$ together are a radical of the formula $-C_nH_{2n}CO-$, in which n is a number from 3 to 11, or $R^3$ and $R^4$ together are a radical of the formula

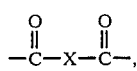, in which X is ethylene or ethenylene which are unsubstituted or substituted by alkyl, or is a carbocyclic radical which is unsubstituted or substituted by alkyl or halogen and to which both the carbonyl groups are bonded in the ortho-position.

2. A moulding composition according to claim 1, wherein the polyester is a polyalkylene terephthalate or a copolyester based on a polyalkylene terephthalate.

3. A moulding composition according to claim 1, which contains the first and the second stabiliser each in a quantity of 0.01 to 10% by weight, relative to the polyester.

4. A moulding composition according to claim 1, wherein the polyepoxide compound is a polyepoxide compound based on bisphenols or phenol or cresol novolaks.

5. A moulding composition according to claim 1, wherein in the formulae I and II, R is an alkylene radical containing 2 to 12 C atoms, a cycloalkylene radical containing 5 to 7 ring C atoms, phenylene or naphthylene.

6. A moulding composition according to claim 1, wherein $R^1$ and $R^2$ independently of one another are a hydrogen atom, phenyl, cyclohexyl or an alkyl group having 1 to 6 carbon atoms.

7. A moulding composition according to claim 1, wherein alkyl radicals $R^3$ contain 1 to 12 C atoms, cycloalkyl radicals $R^3$ contain 5 to 7 ring C atoms, unsubstituted aryl radicals $R^3$ contain 6 to 12 C atoms, and unsubstituted aralkyl radicals contain 7 to 12 C atoms, alkyl substituents in $R^3$ contain 1 to 6 C atoms, and halogen substituents in $R^3$ are chlorine or bromine, acyl radicals $R^4$ contain 2 to 18 C atoms, n in the formula $-C_nH_{2n}CO-$ is a number from 3 to 8, X in the formula

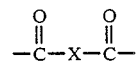

is ethylene which is unsubstituted or monosubstituted or disubstituted by alkyl groups having 1 to 6 C atoms, ethenylene which is unsubstituted or monosubstituted or disubstituted by alkyl groups having 1 to 6 C atoms, or is cyclopentylene, cyclohexylene, cyclohexenylene, phenylene or naphthylene which are unsubstituted or substituted by alkyl having 1 to 6 C atoms or by chlorine or bromine.

8. A moulding composition according to claim 1, which contains, as the second stabiliser, a bisoxazoline of formula I wherein $R^1$ and $R^2$ are hydrogen atoms and R represents $-(CH_2)_r-$ with r being 2 to 10, 1,3- or 1,4-phenylene, 1,3- or 1,4-cyclohexylene.

9. A moulding composition according to claim 1, which contains, as the second stabiliser, a dicarboxylic acid imide or amide of the formula II wherein $R^3$ is alkyl having 1 to 4 carbon atoms, cyclohexyl, phenyl or naphthyl, and $R^4$ is acetyl or benzoyl, or $R^3$ and $R^4$ together are a radical of the formula $-C_nH_{2n}CO-$ in which n is a number from 3 to 8, or $R^3$ and $R^4$ together are a radical of the formula

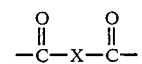

in which X is unsubstituted ethylene or ethenylene or 1,2-phenylene, unsubstituted or substituted by 1 to 4 chlorine or bromine atoms.

10. A moulding composition according to claim 1, which contains, as the second stabiliser, a dicarboxylic acid amide of formula II wherein R represents $-(CH_2)_r-$ with r being 2 to 10, 1,3- or 1,4-phenylene, 1,3- oder 1,4-cyclohexylene, $R^3$ is alkyl having 1 to 4 carbon atoms or phenyl and $R^4$ is acetyl or benzoyl.

11. A moulding composition according to claim 1, which contains, as the second stabiliser, a dicarboxylic acid imide of formula II wherein R represents $-(CH_2)_r-$ with r being 2 to 10, 1,3- or 1,4-phenylene, 1,3- or 1,4-cyclohexylene, and $R^3$ and $R^4$ together are a radical of the formula $-C_nH_{2n}CO-$ in which n is a number from 3 to 5 or $R^3$ and $R^4$ together are a radical of the formula

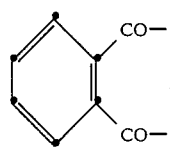

12. A moulding composition according to claim 1, which contains a bisoxazoline of the formula

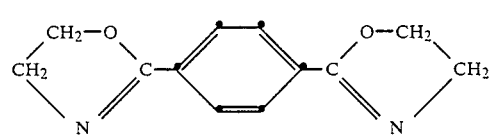

as the second stabiliser of the formula I.

13. A moulding composition according to claim 1, which contains an imide compound of the formula

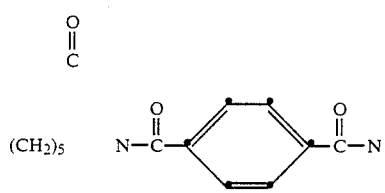
as the second stabiliser of the formula II.
14. A moulding composition according to claim 1, which contains an imide compound of the formula
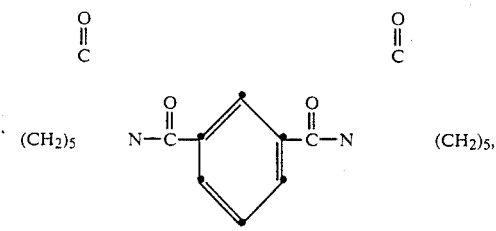
as the second stabiliser of the formula II.
15. A moulding composition according to claim 1, which contains an imide compound of the formula
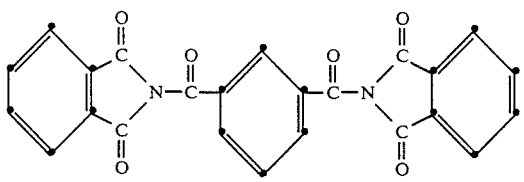
as the second stabiliser of the formula II.
* * * * *

UNITED STATES PATENT AND TRADEMARK OFFICE
CERTIFICATE OF CORRECTION

PATENT NO. : 4,499,219

DATED : February 12, 1985

INVENTOR(S) : Lothar Buxbaum, Franz Breitenfellner, Thomas Kainmuller

It is certified that error appears in the above-identified patent and that said Letters Patent is hereby corrected as shown below:

Column 7, Lines 53-67 should read--

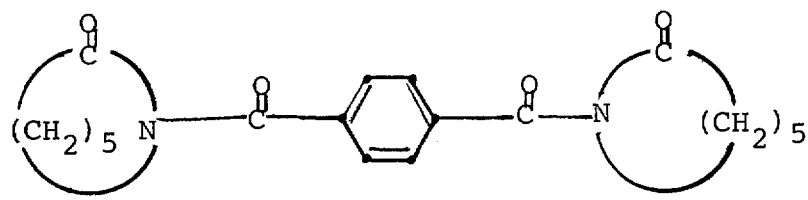

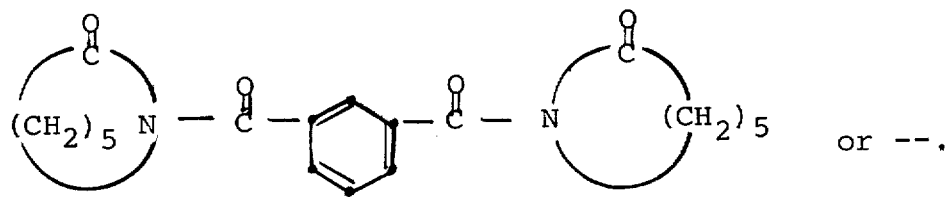   or --.

UNITED STATES PATENT AND TRADEMARK OFFICE
CERTIFICATE OF CORRECTION

PATENT NO. : 4,499,219

DATED : February 12, 1985

INVENTOR(S) : Lothar Buxbaum, Franz Breitenfellner, Thomas Kainmuller

It is certified that error appears in the above-identified patent and that said Letters Patent is hereby corrected as shown below:

Column 10, Lines 2-9 should read--

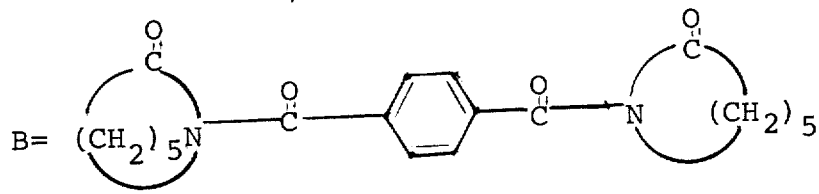

Cloumn 10, Lines 19-27 should read--

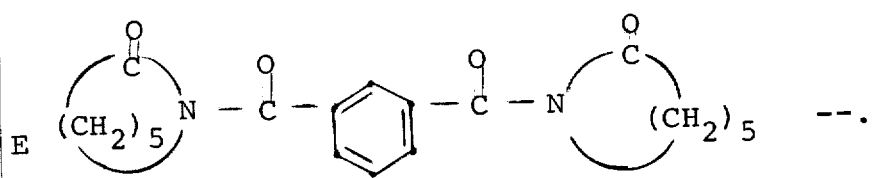

--.

UNITED STATES PATENT AND TRADEMARK OFFICE
CERTIFICATE OF CORRECTION

PATENT NO. : 4,499,219          Page 3 of 4

DATED : February 12, 1985

INVENTOR(S) : Lothar Buxbaum, Franz Breitenfellner, Thomas Kainmuller

It is certified that error appears in the above-identified patent and that said Letters Patent is hereby corrected as shown below:

Claim 8 Column 12 Line 17 should read:

-- R represents $-(CH_2)_r-$ with r being 2 to 10, 1,3- or --.

UNITED STATES PATENT AND TRADEMARK OFFICE
CERTIFICATE OF CORRECTION

PATENT NO. : 4,499,219

DATED : February 12, 1985

INVENTOR(S) : Lothar Buxbaum, Franz Breitenfellner, Thomas Kainmuller

It is certified that error appears in the above-identified patent and that said Letters Patent is hereby corrected as shown below:

Claim 13 Column 13 Lines 7-14 should read--

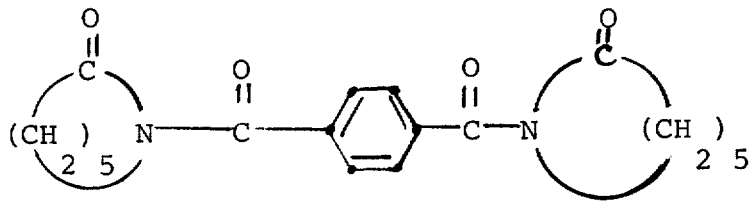

Claim 14, column 14, Lines 2-10 should read:

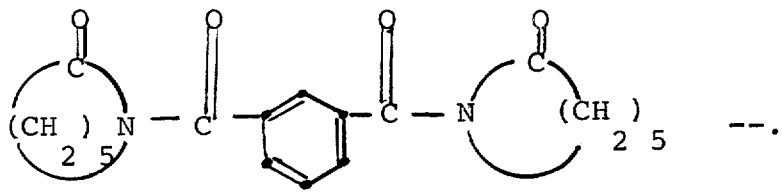  --.

Signed and Sealed this

Seventeenth Day of September 1985

[SEAL]

Attest:

DONALD J. QUIGG

Attesting Officer

Commissioner of Patents and Trademarks—Designate